United States Patent
Traber et al.

(10) Patent No.: US 10,883,029 B2
(45) Date of Patent: Jan. 5, 2021

(54) SEALING BODY FOR DYNAMIC APPLICATIONS

(71) Applicant: Carl Freudenberg KG, Weinheim (DE)

(72) Inventors: Boris Traber, Hirschberg (DE); Christine Portela Cubillo, Bickenbach (DE); Helmut Leitner, Hemsbach (DE); Randolph Gaa, Viernheim (DE); Olaf Kobs, Gorxheimertal (DE)

(73) Assignee: CARL FREUDENBERG KG, Weinheim (DE)

( * ) Notice: Subject to any disclaimer, the term of this patent is extended or adjusted under 35 U.S.C. 154(b) by 196 days.

(21) Appl. No.: 15/516,026

(22) PCT Filed: Sep. 14, 2015

(86) PCT No.: PCT/EP2015/070912
§ 371 (c)(1),
(2) Date: Mar. 31, 2017

(87) PCT Pub. No.: WO2016/050487
PCT Pub. Date: Apr. 7, 2016

(65) Prior Publication Data
US 2017/0292051 A1  Oct. 12, 2017

(30) Foreign Application Priority Data
Oct. 1, 2014 (DE) .................. 10 2014 014 392

(51) Int. Cl.
| | | |
|---|---|---|
| *C09K 3/10* | (2006.01) | |
| *C08K 3/04* | (2006.01) | |
| *C08K 7/24* | (2006.01) | |
| *F16J 15/3284* | (2016.01) | |

(52) U.S. Cl.
CPC .............. *C09K 3/1009* (2013.01); *C08K 3/04* (2013.01); *C08K 3/041* (2017.05); *C09K 3/1006* (2013.01); *F16J 15/3284* (2013.01); *C08K 2201/011* (2013.01); *C09K 2003/1053* (2013.01); *C09K 2200/0208* (2013.01); *C09K 2200/0607* (2013.01); *C09K 2200/0637* (2013.01); *C09K 2200/0642* (2013.01)

(58) Field of Classification Search
CPC ............... C09K 3/1009; C09K 3/1006; C09K 2003/1053; C09K 2200/0208; C09K 2200/0607; C09K 2200/0637; C09K 2200/0642; C08K 3/041; C08K 3/04; C08K 2201/011; C08K 7/42; F16J 15/3284; F16J 15/3294; C08L 27/12
USPC ........................................................ 524/546
See application file for complete search history.

(56) References Cited

U.S. PATENT DOCUMENTS

| | | | | |
|---|---|---|---|---|
| 8,127,902 | B2 * | 3/2012 | Pasino | .................. G06F 30/23 188/322.17 |
| 2011/0156357 | A1 * | 6/2011 | Noguchi | .............. C09K 3/1009 277/336 |
| 2011/0207872 | A1 | 8/2011 | Schinkel et al. | |

FOREIGN PATENT DOCUMENTS

| | | |
|---|---|---|
| CA | 2803136 A1 | 12/2011 |
| DE | 102010002244 A1 | 8/2011 |
| DE | 102011001244 A1 | 9/2012 |
| EP | 2138535 A1 | 12/2009 |
| FR | 2931528 A1 | 11/2009 |
| JP | 2004132486 A | 4/2004 |
| JP | 2008223781 A | 9/2008 |
| JP | 2010018744 A | 1/2010 |
| JP | 2013023575 A | 2/2013 |
| JP | 2013083343 A | 5/2013 |
| RU | 2003136187 A | 5/2005 |
| RU | 2495887 C1 | 10/2013 |
| WO | WO 2011077595 A1 | 6/2011 |

OTHER PUBLICATIONS

JP 2004-132486 A, machine translation, JPO Japan Platform for Patent Information (J-PlatPat). (Year: 2004).*
JP 2008-223781 A, machine translation, JPO Japan Platform for Patent Information (J-PlatPat). (Year: 2008).*
Bokobza et al: "Multiwall carbon nanotube elastomeric composites: A review", Polymer, Elsevier Science Publishers B.V, GB, vol. 48, No. 17, Aug. 3, 2007 (Aug. 3, 2007), pp. 4907-4920, XP022183984.

* cited by examiner

*Primary Examiner* — Josephine L Chang
(74) *Attorney, Agent, or Firm* — Leydig, Voit & Mayer, Ltd.

(57) ABSTRACT

A sealing body for dynamic applications has a Shore A hardness of between 60-100, comprising an elastomer material and carbon nanotubes distributed in the elastomer material in an amount of between 0.1-20 phr, with respect to the total amount of elastomer material.

11 Claims, No Drawings

SEALING BODY FOR DYNAMIC APPLICATIONS

CROSS-REFERENCE TO RELATED APPLICATIONS

This application is a U.S. national stage application under 35 U.S.C. § 371 of International Application No. PCT/EP2015/070912, filed on Sep. 14, 2015, and claims benefit to German Patent Application No. DE 10 2014 014 392.9, filed on Oct. 1, 2014. The International Application was published in German on Apr. 7, 2016, as WO 2016/050487 A1 under PCT Article 21(2).

FIELD

The invention relates to a sealing body for dynamic applications. The invention also relates to a method for producing the sealing body and to the use thereof for dynamic applications.

BACKGROUND

Sealing bodies for dynamic applications seal systems in which the seal and/or the mating surface moves. This movement may include both low-frequency and high-frequency movements and results in wear in the sealing body that manifests itself as abrasive wear. This may result in frictional heat. As a result of abrasive wear, the sealing body may also become untight or fail. For the service life of these components to be extended, the reduction in abrasive wear of sealing bodies for dynamic applications is a permanent requirement.

It is known that introducing various fillers, in particular hard fillers, in the sealing bodies can reduce abrasive wear. Mineral fillers are usually used. This makes it possible to significantly increase the service life of the components.

The sealing bodies known from the prior art are disadvantageous in that a large amount of hard fillers is required in order to sufficiently reduce abrasive wear. This undesirably increases the hardness of the sealing body. Furthermore, hard fillers result in severe wear on the counter surface (shaft run in), and this may also cause the seal to become untight and to thus fail prematurely. This results in the service life being severely limited because sealing bodies for dynamic applications are very often exposed to high temperatures and high pressures during use, as a result of which the sealing body is subject to even more wear. This problem has previously been solved by using high amounts of filler so as to increase service life.

SUMMARY

An aspect of the invention provides a sealing body for dynamic applications, the body comprising: an elastomer material comprising a rubber; and carbon nanotubes distributed in the elastomer material in an amount in a range of from 0.1 to 20 phr, based on 100 parts by weight of rubber, wherein the body has a Shore A hardness of in a range of from 60 to 100.

DETAILED DESCRIPTION

An aspect of the invention is to design and develop a sealing body of the type mentioned at the outset such that said sealing body has a long service life in combination with a hardness that is suitable for sealing applications. The sealing body is intended to also have good mechanical properties, for example low abrasive wear (wear), and to be able to be operated without any difficulty and while producing little noise. Furthermore, the sealing body is intended to be suitable for applications in the high-temperature range and/or at high pressures.

An aspect of the invention is achieved by providing a sealing body for dynamic applications having a Shore A hardness of 60-100, comprising an elastomer material containing a rubber, and carbon nanotubes distributed in the elastomer material in an amount of from 0.1 to 20 phr, based on 100 parts by weight of rubber. A sealing body in a dynamic application is to be understood to mean a sealing body in which said sealing body or the mating surface thereof is subject to a dynamic movement in the system to be sealed.

Carbon nanotubes are microscopic tube-shaped objects (molecular nanotubes) made of plastics material. The walls of said objects consist of carbon, the carbon atoms assuming a honeycomb-like hexagonal structure and each having three binding partners.

Surprisingly, according to an aspect of the invention, it was found that the introduction of carbon nanotubes, even in a small amount, can significantly reduce the abrasive wear of sealing bodies in dynamic applications. This is also true with respect to the reduction of abrasive wear in high-temperature applications. Furthermore, surprisingly, only very small amounts of carbon nanotubes, specifically amounts of less than 20 phr, are required in order to produce this effect. It was also found that the sealing bodies containing carbon nanotubes are only moderately harder than sealing bodies of the same Shore A hardness that are filled with minerals and/or carbon black. Therefore, the sealing bodies according to the invention can be produced so as to be within the hardness range of 60-100 Shore A which is particularly suitable for dynamic applications. Furthermore, it was found that the introduction of carbon nanotubes as opposed to conventional mineral fillers and/or carbon blacks, which have been used previously, results in an improved property profile in terms of other properties relevant to applications in sealing technology, such as coefficient of friction, tensile strength and elongation at break. It was also found that, surprisingly, carbon nanotubes only cause a low amount of wear on the counter surface (shaft run in) despite the low filler content and high level of hardness of the mixture. Analysis has shown that the sealing bodies according to the invention have a coefficient of friction of less than $\mu=1$, as measured according to DIN ISO 15113, depending on the amount of carbon nanotubes used.

The use of carbon nanotubes in sealing bodies is also advantageous in that said carbon nanotubes can confer electrically conductive properties to said sealing bodies. The combination of electrical conductivity and reduced abrasive wear is of particular interest in various dynamic applications, such as radial shaft sealing rings, hydraulic seals, rod seals, piston seals, membranes and bellows.

For example, the rotational movement of a radial shaft sealing ring can electrostatically charge the sealing body. The electric charge cannot be conducted by the conventionally used mineral fillers because said fillers have insulating properties. Although other conventional filler systems, such as conductive carbon blacks, can make the sealing body conductive such that the electrostatic charge can therefore also be conducted, filler systems of this kind significantly increase abrasive wear. Conversely, the use of carbon nanotubes according to the invention makes it possible to effectively conduct electrostatic charge and at the same time provides for protection against abrasive wear. According to a preferred embodiment of the invention, the sealing body has a specific electrical volume resistance and/or a specific surface resistance of <10^6 ($\Omega \times cm^2$)/cm, preferably of <10^5 ($\Omega \times cm^2$)/cm, particularly preferably of <10^4 ($\Omega \times cm^2$)/cm, as measured in accordance with DIN IEC 60093.

Furthermore, the sealing body can be operated without any difficulty and while producing little noise.

Practical tests have shown that carbon nanotubes, even in an amount of less than 20 phr, can significantly reduce the abrasive wear of sealing bodies in dynamic applications. The proportion of carbon nanotubes in the sealing body is preferably from 0.1 phr to 15 phr, more preferably from 0.4 phr to 10 phr, most preferably from 0.5 phr to 7 phr, and in particular from 1 phr to 5 phr.

The unit "parts per hundred rubber (phr)" is a standard unit in the rubber chemistry industry. It denotes the weight proportion of the individual mixture components in a formula of an elastomer mixture. In this case, these designations each relate to 100 parts (by weight) of the rubber or rubbers (in the case of rubber blends).

According to a preferred embodiment of the invention, the carbon nanotubes are uniformly distributed and/or scattered in the sealing body. Commercially available CNTs are generally in an agglomerate. However, the properties found in carbon nanotubes develop more effectively when said nanotubes are uniformly distributed and/or scattered in the polymer matrix. It is easy to detect uniform scattering and distribution in electron spectroscopic images, for example scanning electron microscopic images.

The scattering and uniform distribution preferred according to the invention can be achieved for example by means of predispersion and high-shear units, e.g. a transverse pin mixing extruder. Tests can also be used to demonstrate that the carbon nanotubes are scattered and uniformly distributed in the sealing body. For example, according to the invention, the carbon nanotubes are scattered and uniformly distributed in the sealing body at least if, when a test plate made of the material of the sealing body having the dimensions 200×200×2 mm is subject to at least 20 tensile tests in accordance with DIN 53504, a statistical deviation for tensile strength and elongation at break is measured that is less than 30%, preferably less than 20%, more preferably less than 15%, most preferably less than 12%, and particularly preferably less than 10%, as measured in the longitudinal and transverse direction in each case. Measurements for tensile strength and elongations at break are obtained using the tensile test in accordance with DIN 53504 by one defined test piece (S2-rod) being punched from a vulcanized test plate in each tensile test and being stretched in a tensile testing machine until it breaks. This means that, in this test, the anisotropic distribution of the recorded values is determined.

Practical tests have shown that good results can be achieved using various types of carbon nanotubes. Thus, the diameter of the carbon nanotubes can vary over wide ranges. In particular, carbon nanotubes having average diameters in the range of from 1 to 100 nm, preferably from 2 to 50, more preferably from 3 to 30, most preferably from 4 to 20, and in particular from 5 to 15 nm, have been proven to be suitable.

The carbon nanotubes may also be open and/or closed tubes having one wall and/or a plurality of walls. Carbon nanotubes having a plurality of walls are advantageous in that they are, at present, inexpensive.

The elastomer material can contain a wide range of rubbers suitable for sealing materials. These may include polymers that are chemically or physically cross-linked in a loose manner, behave in an energy-elastic manner below the glass transition point thereof and are rubbery-elastic at temperatures above the glass transition point thereof. Glass transition temperatures of rubbers which are preferably used are of 20° C. and below. The rubbers used preferably behave in a rubbery-elastic manner up to the melting temperature or decomposition temperature thereof.

The elastomer material could contain ethylene vinyl acetate (EVA). This plastics material is inexpensive and stable up to 140° C. The resilient plastics body could contain NBR (nitrile butadiene rubber). This plastics material can be processed in a cost-effective manner. The elastomer material could contain HNBR (hydrated nitrile butadiene rubber). This plastics material is stable even up to 150° C. and is free of halogens. The elastomer material could contain FKM (fluororubber). This plastics material is particularly chemically stable when in contact with fuel. The elastomer material could contain silicon elastomers. These plastics materials are soft and resilient even at temperatures below 0° C. In particular, fluorinated silicone elastomers could be used. These are fuel resistant.

The elastomer material could contain NR (natural rubber). The use of NR (natural rubber) is advantageous in that NR (natural rubber) is particularly resilient. The elastomer material could contain SBR (styrene butadiene rubber). SBR (styrene butadiene rubber) is advantageous in that this plastics material is almost as resilient as NR (natural rubber) but is less permeable to gas. The elastomer material could contain NBR (nitrile butadiene rubber). The use of this plastics material is advantageous in that said plastics material is oil resistant and has low-temperature flexibility. The elastomer material could contain HNBR (hydrated nitrile butadiene rubber). The use of HNBR (hydrated nitrile butadiene rubber) is advantageous in that this plastics material has a high temperature resistance and a high media resistance. The elastomer material could contain EPDM (ethylene propylene diene rubber). The use of this plastics material is advantageous in that said plastics material has a high resistance in polar media and is thus a standard material for systems that come into contact with water in particular. Furthermore, EPDM is resistant to urea solutions and aqueous media. The elastomer material could contain EPM (ethylene propylene rubber). The use of this plastics material is advantageous in that said plastics material has good resistance to aqueous media and is very flexible at low temperatures. The elastomer material could contain ACM (acrylate rubber). The use of this plastics material is advantageous in that said plastics material has high resistance in nonpolar media. ACM (acrylate rubber) is therefore a standard material for systems that come into contact with nonpolar oils in particular. The elastomer material could contain FFKM (perfluoroelastomer rubber). The use of FFKM (perfluoroelastomer rubber) is advantageous in that said material has an extremely high media resistance and an extremely high temperature resistance. The elastomer material could contain VMQ and PVMQ (vinyl methyl polysiloxane and phenyl vinyl methyl polysiloxane). The use of these plastics materials is advantageous in that said plastics materials have a high low-temperature flexibility. The plastics body could contain FVMQ (fluoro methyl vinyl polysiloxane). The use of this plastics material is advantageous in that said plastics material also has a high media resistance and a high temperature resistance and is extremely flexible at low temperatures. The elastomer material could contain IR (isoprene rubber). The use of this plastics material is advantageous in that said material can be of a good quality. The elastomer material could contain IIR, CIIR and BIIR (butyl rubber, chlorobutyl rubber and bromobutyl rubber). The use of these plastics material is advantageous in that said plastics materials are highly impermeable. The elastomer material could contain AEM (ethylene acrylic rubber). The use of this plastics material is advantageous in that said plastics material is highly damping and resistant to engine and gear oils. The elastomer material could contain BR (butadiene rubber). The use of this plastics material is advantageous in that said plastics material is resistant to wear and has low-temperature flexibility. The elastomer material could contain CR (chloroprene rubber). The use of this plastics material is advantageous in that said plastics material is weather resistant. The elastomer material could contain ECO (epichlorohydrin rubber). The use of this plastics material is advantageous in that said plastics material is impermeable and resistant to engine and gear oils. The elastomer material could contain CSM (chlorosulfonated polyethylene rubber). The use of this plastics material is advantageous in that said plastics material is highly damping and resistant to engine and gear oils. The elastomer material could contain polyurethane (PU). The use of this plastics material is advantageous in that it is resistant to wear. The elastomer material could contain TPE (thermoplastic elastomers, ABS and SBS). The use of this class of plastics materials is advantageous in that said plastics materials can be processed in a cost-effective manner.

It is also conceivable to use mixtures and/or blends of the aforementioned materials.

According to the invention, the elastomer material preferably comprises FFKM, FKM, NR, IR, IIR, CR, ECO, EPDM, EPM, NBR, HNBR, PU, ACM, AEM, VMQ, FVMQ and blends thereof and/or mixtures with thermoplastic materials. In practical tests, particularly good results were achieved using FKM.

According to a preferred embodiment of the invention, the elastomer material contains PVMQ, VMQ, FVMQ and blends thereof and has a Shore A hardness of >70 Shore. According to the invention, it was found that it is possible to produce a sealing body based on these materials that has both a high level of hardness and good abrasion resistance. This was therefore surprising because silicon materials that were previously commercially available could not be produced having a Shore A hardness of above 80 Shore.

According to a further preferred embodiment of the invention, the elastomer material comprises EPDM, PVMQ, VMQ, FVMQ, CR, ECO and blends thereof and/or mixtures thereof with thermoplastic materials and has an abrasion volume of <120 mm$^3$, as measured in accordance with DIN ISO 4649.

According to the invention, the elastomer component in the elastomer material is preferably at least partially cross-linked. The following cross-linking agents are preferably used for cross-linking: peroxides, sulfur, sulfur soaps, diamines, polyamines, diamine carbamates, diols, polyols, in particular bisphenols, diisocyanates, polyisocyanates, diepoxides, polyepoxides, diglycidyl ethers, triazines, methylenedianiline, dicarboxylic acids, polycarboxylic acids, metal oxides, ETU, platinum catalysts and/or the mixtures thereof or substances that release the aforementioned substances. Alternatively or in addition, high-energy beams and/or UV radiation can be used for cross-linking.

Particularly preferred cross-linking agents are peroxides, sulfur, hexamethylene diamine carbamate, hexamethylene diamine, octamethylene diamine and/or 2,2-bis[4-(4-aminophenoxy)phenyl]propane and bisphenols.

According to a preferred embodiment of the invention, the sealing body comprises FKM, NBR, EPDM, AEM, VMQ, FVMQ, PVMQ and/or HNBR as the elastomer material, which is preferably cross-linked using peroxides. Surprisingly, according to the invention, it was found that a sealing body of this kind has low-temperature flexibility under dynamic load at temperatures of <−50° C. and, at the same time, is resistant to wear and abrasion at high temperatures (up to 170° C.). Therefore, by way of example, a sealing body according to the invention that is designed as a monotube shock absorber seal is tight on a low-temperature test rig under the action of both a dynamic movement of a piston rod and a one-time side load on the rod at temperatures as low as −50° C. According to a further preferred embodiment, the sealing body comprises FKM as the elastomer material, which is preferably cross-linked using bisphenols. In this case, according to the invention, it was found that a sealing body of this kind has low-temperature flexibility at temperatures of <−30° C. and, at the same time, is resistant to wear and abrasion at high temperatures (up to 170° C.). This also applies to applications involving high pressures (up to 250 bar).

According to a further preferred embodiment, the sealing body comprises EPDM, NBR and HNBR as the elastomer material, which is preferably cross-linked using sulfur. In this case, according to the invention, it was found that a sealing body of this kind has low-temperature flexibility at temperatures of <−60° C. and, at the same time, is resistant to wear and abrasion at high temperatures (up to 170° C.). This also applies to applications involving high pressures (up to 250 bar).

According to a further preferred embodiment, the sealing body comprises ACM and AEM as the elastomer material, which is preferably cross-linked using diamines. In this case, according to the invention, it was found that a sealing body of this kind has low-temperature flexibility at temperatures of <−30° C. and, at the same time, is resistant to wear and abrasion at high temperatures (up to 170° C.). This also applies to applications involving high pressures.

According to a further preferred embodiment of the invention, the sealing body comprises VMQ, FVMQ and/or PVMQ as the elastomer material, which is preferably cross-linked by addition. Surprisingly, according to the invention, it was found that a sealing body of this kind has low-temperature flexibility at temperatures of <−50° C. and, at the same time, is resistant to wear and abrasion at high temperatures (up to 220° C.).

The cross-linking agent interconnects or cross-links the monomers of the elastomer material by chemical bridges at certain points.

The expression "cross-linked by addition" is to be understood in the conventional manner. In particular, the expression is to be understood to mean a chemical reaction in which a reactive species of a cross-linking agent, e.g. silanes, reacts with the double bond of a polymer, e.g. vinyl group of a siloxane, under the action of a catalyst, e.g. Pt.

In a preferred embodiment, an activator is used in addition to the cross-linking agent, which activator is selected from potassium stearate, sodium stearate, sodium oleate, other alkali salts and alkaline-earth salts of fatty acids, zinc dithiophosphate, zinc dibutyldithiocarbamate, zinc dimethyldithiocarbamate, iron dimethyldithiocarbamate, di-ortho-tolylguanidine (DOTG), diphenylguanidine (DPG), dipentamethylenethiuram disulfide, synthetic hydrotalcite, Diuron, octadecyl triethyl ammonium bromide, octadecyl triethyl phosphonium bromide, diazabicycloundecene (DBU), diethylthiourea, ammonium benzoate, trimercaptos-triazine, sodium 2-ethylhexanoate and/or from the mixtures thereof.

As an alternative or in addition to the activator, a coagent can be added to the peroxide cross-linking agent, which coagent is selected 2,4,6-tris(allyloxy)-1,3,5-triazine (TAC), triallyl isocyanurate (TAIC), 1,2-polybutadiene, 1,2-polybutadiene derivatives, N,N'-phenylene bismaleimide, diacrylates, triacrylates, in particular trimethylpropane triacrylate, dimethacrylates and/or trimethacrylates, in particular trimethylolpropane trimethacrylate (TRIM).

Depending on the field of application, the elastomer material may contain at least one additive which is selected from fillers, plasticizers, processing aids, antidegradants, antioxidants, flame retardants, dyes, pigments and/or the mixtures thereof.

The additives can increase the physical properties, such as the tensile strength or the elongation at break, of the elastomer material. The additives can also improve the feel and/or the look of the thermoplastics elastomer composition.

If it is desired that the hardness and stiffness of the elastomer material be increased further, the elastomer material can contain additional fillers, preferably in an amount of from 1 phr to 600 phr, more preferably from 2 phr to 200 phr, even more preferably from 3 to 100 phr, most preferably from 4 to 80 phr, and in particular from 5 to 70 phr.

In order to improve tensile strength, carbon black is preferably used as an additional filler. Furthermore, additional fillers can be introduced in order to increase the volume and/or weight of the mixture and/or in order to improve the physical properties of the mixture. In order to improve the tensile strength and wear resistance, mineral fillers, such as silicates, clay, mica, silica, chalk, kaoline, magnesium silicates, aluminum silicates, are preferably used as additional fillers. Furthermore, additional fillers can be introduced in order to increase the volume and/or weight of the mixture and/or in order to improve the physical properties of the mixture. The additional filler is preferably selected from carbonates, oxides, carbon black, graphite, active coal, calcium sulfate, barium sulfate, aluminum hydroxide and/or the mixtures thereof.

The use of carbon blacks is advantageous in that carbon blacks increase the inherent electrical conductivity of the CNTs even further and provide improved mechanical reinforcement. The use of mineral fillers is advantageous in that wear resistance is significantly improved and the mixture can be colored.

The elastomer material may contain plasticizers, selected from phthalate esters, polyesters, ether esters, sebacates, polythioethers, phosphates, trimellitate esters, sulfonamides and/or the mixtures thereof, preferably in an amount of from 0.1 phr to 50 phr.

According to a preferred embodiment, the elastomer material may contain an antioxidant, selected from polycarbodiimides, substituted phenols, substituted bisphenols, dihydroquinoline, diphenylamine, phenyl naphthylamine, paraphenyl diamine, paraphenylene diamine, benzimidazole and/or the mixtures thereof, preferably in an amount of from 0.1 phr to 15 phr.

The present invention also relates to a method for producing a sealing body according to the invention, comprising the following steps: incorporating CNTs into an elastomer material, which optionally contains additives, in a mixing device to form an elastomer mixture, molding and optionally cross-linking to form the sealing body.

The CNTs can be incorporated in a continuous or discontinuous manner. In order to produce the elastomer mixture, the elastomers used, the carbon nanotubes and the optional additives can be mixed in different orders. In this process, the elastomers, the carbon nanotubes and/or the additive(s) can be added as pellets, granules, powders or melts.

According to a preferred embodiment, the additives are initially mixed with the rubber and heated. It is expedient if the rubber is comminuted and if the elastomers, the carbon nanotubes and the optional additives are mixed in a particularly homogenous manner, e.g. in the internal mixer at a speed in the range of from 50 to 250 rpm.

As a result, it is possible to homogenously distribute the carbon nanotubes in the sealing body as is preferred according to the invention. This uniform distribution can also be achieved, for example, by means of predispersion and high-shear units, e.g. a transverse pin mixing extruder. In order to produce the mixture in a discontinuous manner, internal mixers having meshing or tangential rotor geometries can be used, for example Banbury mixers or Farrel mixers. Discontinuous production is particularly flexible, in particular when different rubber mixtures are intended to be produced. In order to produce the mixture in a continuous manner, extruders such as a twin-screw extruder can be used. Mixing devices that are even more preferred are roll mills.

Molding can be achieved using processes known in the prior art, for example compression molding (CM) or injection molding (IM).

Depending on the rubber material used, cross-linking expediently takes place during molding, thus forming chemical and/or physical bonds. As known by a person skilled in the art, this cross-linking can be brought about in the usual manner, for example, using heat and/or UV radiation.

It is also conceivable for the rubber to be cross-linked using the cross-linking agent during mixing, i.e. in situ, in particular in accordance with the principle of dynamic cross-linking.

The sealing body may also undergo subsequent thermal treatment.

The sealing body could be designed as a resilient plastics body having a Shore A hardness, which is set according to the intended application in each case, of preferably 60 to 100, in particular from 70 to 90 Shore A and/or from 75 to 95 Shore A. A sealing body of this kind is at least partially deformable. Furthermore, said sealing body has a satisfactory resilience that ensures that the system is tight. Moreover, the elastomer material can be processed even at high Shore hardness, i.e. can be processed according to the aforementioned molding processes, unlike the conventional filler systems that do not contain any CNTs.

According to the invention, the sealing body is preferably designed as a one-piece plastics body. This is advantageous in that the body is uniformly loaded and it is therefore possible to prevent material fatigue. Furthermore, manufacturing is simple.

According to a particularly preferred embodiment of the invention, the sealing body is in the form of a dynamic seal, for example in the form of a shock absorber seal, a radial shaft sealing ring (for example Radiamatic®), cassette seals, a grooved ring seal, a lip sealing ring, a valve stem seal, a rod seal, a piston seal, membrane, a bellows, a hydraulic seal and/or an actuator for valve applications. According to a particularly preferred embodiment of the invention, the sealing body is in the form of a static seal for dynamic applications, for example designed as an O-ring, X-ring, D-ring or frame seal.

According to an embodiment, a sealing body can be characterized by a coefficient of friction of less than 1.5µ. According to an embodiment, a sealing body can be characterized in that a test plate made of the elastomer material has a coefficient of friction of less than µ=1, as measured in accordance with DIN ISO 15113.

According to an embodiment, a sealing body can be characterized in that the elastomer material comprises FFKM, FKM, NR, IR, IIR, CR, ECO, EPDM, EPM, NBR, HNBR, PU, ACM, AEM, VMQ, FVMQ and blends thereof and/or mixtures thereof with thermoplastic materials.

The invention is explained in more detail in the following with reference to two examples.

Example 1: Improvement of the Abrasion Resistance of a Radial Shaft Sealing Ring A mixture which was typical for radial shaft sealing applications and in which carbon nanotubes were uniformly distributed was produced and tested with respect to specific characteristic values.

The starting materials used were:
terpolymer of vinylidene fluoride, hexafluoropropylene, and tetrafluoroethylene (Dyneon 2350® from 3M)
wollastonite filler Nyad 400® from Nyco
magnesium oxide filler (Maglite Y® from Nordmann Rassmann)
cross-linking activator (Rhenofit CF® from RheinChemie Rheinau)
separating agent (Carnauba wax 2442® from Kahl GmbH)
carbon nanotubes (Nanocyl NC 7000® from Nanocyl)

The mixtures were mixed in a Thyssenkrupp GK 1.5E [1.7 l] internal mixer and homogenized on an Agila [1.8 l] roll mill.

| Raw material | Reference 1 | Compound 1 |
|---|---|---|
| Dyneon 2350 | 100 phr | 100 phr |
| Nyad 400 | 40 phr | 40 phr |
| Maglite Y | 6 phr | 6 phr |
| Rhenofit CF | 3 phr | 3 phr |
| Carnauba wax | 1 phr | 1 phr |
| Nanocyl NC 7000 | | 5 phr |

Components were manufactured from the reference mixture and Compound 1, which components had the BAUM 35-52-7 (model) dimensions, and were measured on a test rig for radial shaft sealing rings. The measurement was taken in accordance with the DIN 3761 standard. The increase in the width of the running track during operation is used as a measurement for the abrasive wear of a radial shaft sealing ring; the greater the increase in the running track width, the greater the abrasive wear and thus the shorter the service life. The result was that a running track width of 0.8 mm was measured for the reference and a running track width of 10.2 mm was measured for the compound, and this signifies a significant reduction. Furthermore, the running track of the tested components containing Compound 1 had a significantly improved look, which manifested itself as a very smooth surface.

Example 2: Production of a Shock Absorber Seal

The invention was tested in a mixture that was typical for shock absorbers. The starting materials used were:
fluoroelastomer Technoflon P 757® from Solvay
wollastonite filler Nyad 400® from Nyco
cross-linking activator TAIC from Kettlitz
cross-linking agent (Luperox® 101 G 45 from Arkema)
carbon nanotubes (Nanocyl NC 7000® from Nanocyl)

The mixtures were mixed in a Thyssenkrupp GK 1.5E [1.7 l] internal mixer and homogenized on an Agila [1.8 l] roll mill.

| Raw material | Reference 2 | Compound 2 |
|---|---|---|
| Technoflon P 757 | 100 phr | 100 phr |
| Nyad 400 | 60 phr | 60 phr |
| TAIC | 2 phr | 2 phr |
| Luperox 101G 45 | 2 phr | 2 phr |
| Nanocyl NC 7000 | | 5 phr |

Components were manufactured from Reference mixture 2 and Compound 2, which components had DHSWV 11-31, 2-1,5 dimensions, and were measured on a test rig for monotube shock absorber seals on a low-temperature test rig. For this purpose, a shock absorber that contained the seal to be tested was mounted in a device that allowed the piston rod of the shock absorber to move in the axial direction. The shock absorber that was to be tested contained an installation space that contained oil, oil leakage being the criterion on the basis of which tightness was assessed. The shock absorber was cooled in a cooling chamber down to the starting test temperature (in this case −50° C.) and clamped into the device. Preconditioning took place by slowly introducing the rod into the shock absorber in a repeated manner, any oil which leaked out of the installation space being removed at this stage. The temperature was measured on the housing of the shock absorber in the vicinity of the seal. The measurement was taken when the rod was moving cyclically, the temperature increasing when the rod moved dynamically as a result of the heat generated thereby. The amount of oil that leaked out of the installation space was measured at increments of 2 Kelvin, and if any oil drops had leaked out, the seal was deemed untight. For each measurement interval, a side load of 250 N was applied just once to the shock absorber. The shock absorber seal that was manufactured from Reference material 2 was tight at temperatures as low as −30° C., whereas the seal manufactured from Compound 2 was tight at temperatures as low as −40° C.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A shock absorber seal, the shock absorber seal comprising:
    an elastomer material comprising FKM; and
    carbon nanotubes distributed in the elastomer material in an amount in a range of from 0.5 to 7 phr, based on 100 parts by weight of rubber,
    wherein the shock absorber seal has a Shore A hardness in a range of from 75 to 95.

2. The shock absorber seal of claim 1, wherein the shock absorber seal has a coefficient of friction of less than 1.5μ.

3. The shock absorber seal of claim 1, having a scattered distribution of the carbon nanotubes in the elastomer material.

4. The shock absorber seal of claim 1, having a uniform distribution of the carbon nanotubes in the elastomer material.

5. The shock absorber seal of claim 1, having a scattered and a uniform distribution of the carbon nanotubes in the elastomer material.

6. The shock absorber seal of claim 1, having a specific electrical volume resistance of <$10^6$ ($\Omega \times cm^2$)/cm, as measured in accordance with DIN IEC 60093.

7. The shock absorber seal of claim 1, having a specific surface resistance of <$10^6$ ($\Omega \times cm^2$)/cm, as measured in accordance with DIN IEC 60093.

8. The shock absorber seal of claim 1, having a specific electrical volume resistance and a specific surface resistance of <$10^6$ ($\Omega \times cm^2$)/cm, as measured in accordance with DIN IEC 60093.

9. A method for producing the shock absorber seal of claim 1, the method comprising:
    incorporating carbon nanotubes into an elastomer material comprising FKM in a mixing unit to form a non-cross-linked elastomer mixture; and
    molding and cross-linking to form the shock absorber seal.

10. A method of sealing an object, the method comprising contacting the shock absorber seal of claim 1 to the object, thereby sealing the object in a dynamic manner.

11. A sealing body for dynamic applications, the body comprising:
    an elastomer material comprising FKM; and
    carbon nanotubes distributed in the elastomer material in an amount in a range of from 0.5 to 7 phr, based on 100 parts by weight of rubber,
    wherein the body has a Shore A hardness of in a range of from 60 to 100, and
    wherein the elastomer material is in a blend or mix with a thermoplastic material.

* * * * *